Oct. 27, 1936.　　　H. L. WALKER　　　2,058,535
SCALE
Original Filed May 27, 1932
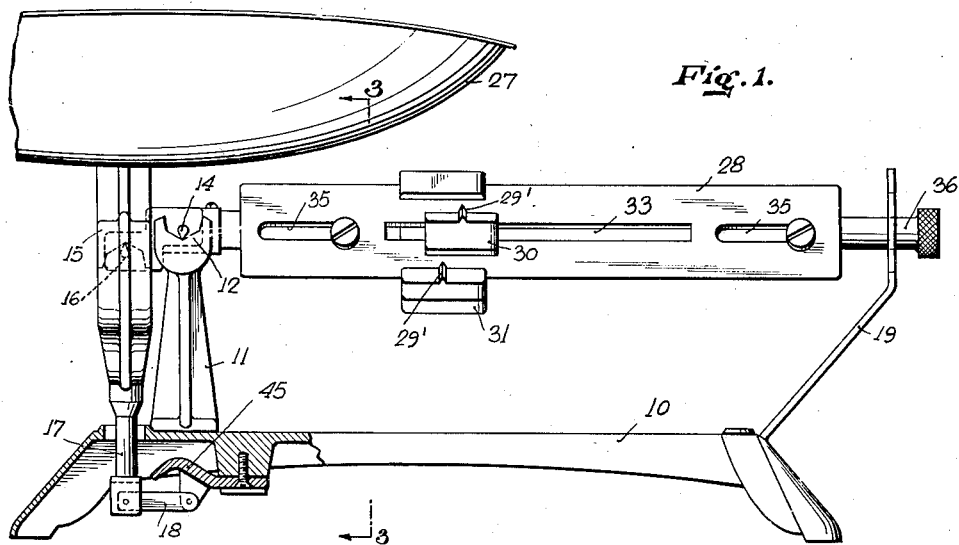
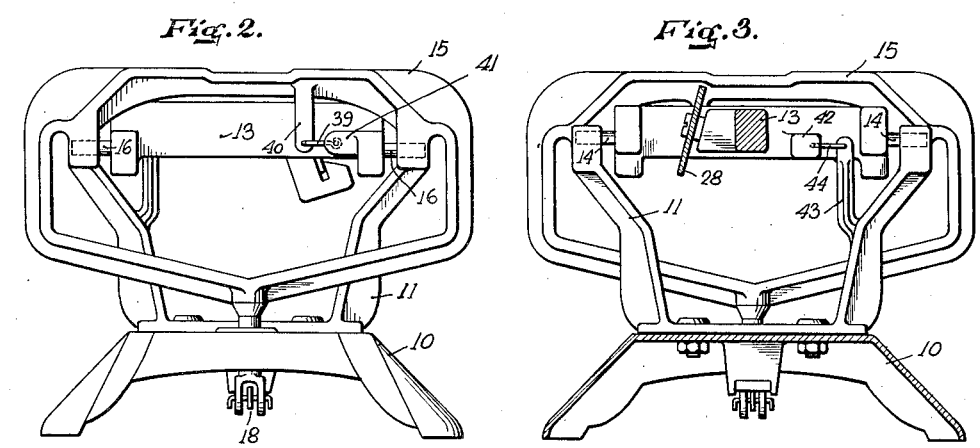
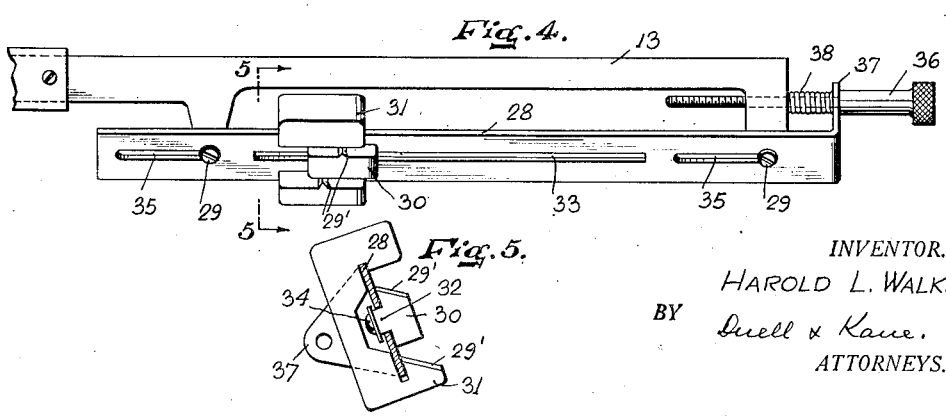
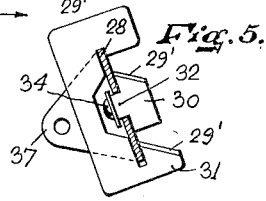
INVENTOR.
HAROLD L. WALKER,
BY Duell & Kane.
ATTORNEYS.

Patented Oct. 27, 1936

2,058,535

UNITED STATES PATENT OFFICE 2,058,535

SCALE

Harold L. Walker, Brooklyn, N. Y., assignor to The Jacobs Bros. Co. Inc., Brooklyn, N. Y., a corporation of New York Original application May 27, 1932, Serial No. 613,889. Divided and this application November 10, 1934, Serial No. 752,413

8 Claims. (Cl. 265—49)

This invention relates to a structurally and functionally improved scale.

This application is a division of application Serial Number 613,889, filed May 27, 1932, on scale, which has matured into Patent 2,033,212.

It is an object of the invention to provide a scale, by means of which, in an improved manner, tare weight may be disposed of.

A further object of the invention is that of furnishing a scale in which the bearing parts will at all times be properly disposed with reference to each other.

Among other objects of the invention are the furnishing of an apparatus of this character which will embody relatively few and rugged parts, each individually simple in construction and capable of quick assemblage and set-up to provide a scale capable of being sold at nominal cost and operating over long periods of time with freedom from difficulty.

With these and other objects in mind, reference is had to the attached sheets of drawing illustrating embodiments of the invention, and in which:

Fig. 1 is a partly sectional front view of a scale;

Fig. 2 is an end view thereof;

Fig. 3 is a transverse sectional view taken along the lines 3—3 and in the direction of the arrows in Fig. 1;

Fig. 4 is a fragmentary view of the poise beam; and

Fig. 5 is a transverse sectional view taken along the lines 5—5 and in the direction of the arrows in Fig. 4.

In these several views the numeral 10 indicates a scale base from which a standard or bracket portion 11 extends upwardly. At the ends of this bracket there are provided, in the usual manner, bearings 12 of any desired type and material. These bearings rockingly support a beam 13 by means of pivots 14. As shown, a pan support 15 is rockingly mounted on bearing members 16 at the end of the short beam arm, this support being extended through the scale base as at 17, and its lower end pivotally secured to one end of a link 18, the opposite end of which is similarly connected to the base and in line with the bearing portions 12—14.

The opposite arm of the beam is extended through a guide-guard plate 19. In order that loads imposed within or upon the pan 27 may be weighed, it is intended that a poise beam 28 be employed which is mounted upon supports 29 extending from the beam 13. This is, of course, in addition to any suitable counter-weight structure which will usually be employed. Poise beam 28 is provided with suitable graduations (not shown), the sub-divisions of which are traversed by pointers 29' forming parts of weights 30 and 31 slidably mounted by the beam 28. In order to provide for such mounting, it is preferred that the weight 30 have one or more extensions 32 riding within the slot 33 of the beam, it being noted, as in Fig. 5, that a securing element 34 may be attached to the projection 32 to prevent displacement of the weight 30. The weight 31 has its end portion slidably embracing the upper and lower edges of the beam and is formed with a centrally recessed portion permitting of the passage of the projections 32 and the retaining elements 34 associated therewith. In this manner it is obvious that loads imposed upon the pan may be accurately weighed.

In certain instances a portion of such loads may be a constant factor and the balance of the loads may be the variable factor, the weight value of which is to be determined. Thus, the constant factor may be allowed for by tare-weight provision. According to the present invention, this result is achieved by slidably mounting the beam 28 for bodily movement longitudinally of the beam 13. To this end the projections 29—or continuations thereof—extend through slots 35 in the beam 28, and adjacent one end of the latter an adjusting screw 36 is provided which bears against the offset end 37 of this beam and engages the corresponding threads in an opening formed in the outer end of the beam 13. A spring 38 may, for example, constantly urge the end 37 of the beam 28 into contact with the end of the screw 36, but in any event it will be understood that as a result of the foregoing it is practicable to adjust the beam 28 longitudinally of the beam 13.

Thus, with a given load factor, and the weights 30—31 in their zero position, it is practicable to shift the beam 28 so as to bring the beam 13 to an even balance condition and compensate for the tare-weight. This will in no wise affect the registration of the tare-weight value as subsequently established by shifting the weights 30—31.

In scales of this general type, considerable difficulty has been experienced due to the fact that the beam tends to shift transversely of its supports, and with this in mind numerous expedients have been resorted to. By means of the present invention it is proposed to overcome these difficulties by employing thrust elements in line with the bearings or pivots. As shown in Fig. 2, an extension 40 is provided as part of the support 15 and an extension 41 is provided in line with the extension 40 and also in line with the pivot element 15, the latter extension forming a part of the beam 13. Interposed between these extensions is a link element 39 which prevents the support from shifting with respect to the beam. As shown in Fig. 3, a further extension 42 is provided as part of the beam and in line with the pivots 14 carrying the beam. An extension 43 forms a part of one of the supports 11. A link element 44, being provided between these latter extensions, it is likewise obvious that shifting of the beam with respect to the supporting bracket 11 is prevented, and consequently these two links while in no wise interfering with the operation of the scale, do definitely prevent an improper shifting of the parts and make unnecessary the various expense factors heretofore resorted to in order to overcome the previously recognized difficulties in this connection. It will, of course, be understood that the plane of the support of the bearing parts 14, 15 and 16 is identical with the beam in a position of rest. It will also be noted that incident to the stop 45 the link connected to the pan support prevents the latter from elevating to a point at which separation of the bearing parts might occur.

Thus, among others, the several objects of the invention as specifically afore noted, are achieved. Obviously, numerous changes and rearrangements of the parts might be resorted to without departing from the spirit of the invention as defined by the claims.

Having described my invention, what I claim as new and desire to secure by Letters Patent is:

1. A scale including, in combination, a base, a rockingly mounted beam, a supporting member pivotally carried by said beam and a transversely extending link member coupling said beam to said base at the point of rocking mounting of the former to prevent transverse shifting of said beam with reference to the structure mounting the same.

2. A scale including, in combination, a rockingly mounted beam, a supporting member pivotally carried by said beam and a transversely extending link member coupling said supporting member to said beam at the point of pivotal mounting of the former and preventing transverse movement of said member with reference to said beam.

3. A scale including, in combination, a base, a rockingly mounted beam, a supporting member pivotally carried by said beam, a transversely extending link member coupling said beam to said base at the point of rocking mounting of the former to prevent transverse shifting of said beam with reference to the structure mounting the same, and a second transversely extending link member coupling said supporting member to said beam at the point of pivotal mounting of said supporting member and preventing transverse movement of the former with reference to said beam.

4. A scale including a rockingly mounted beam, a pan support rockingly positioned upon said beam, a link pivotally connected to said pan support, and a stop cooperating with said link to prevent said pan support being lifted from said beam.

5. A scale including, in combination, a rockingly mounted beam, a substantially coextensive poise beam carried by said first named beam, and spaced therefrom, means for laterally and freely shifting said poise beam with respect to said first named beam, a primary poise weight slidably mounted by said poise beam, a secondary poise weight also mounted by said poise beam and movable with respect thereto, said secondary poise weight being independent of said primary poise weight and both said weights traversing similar areas of said poise beam.

6. A scale including, in combination, a rockingly mounted main beam, a poise beam connected to said main beam and being formed with a slot extending longitudinally of its body, a poise weight slidably mounted upon said poise beam and extending out of contact with the edges of said slot, and a second weight slidably mounted by said poise beam and riding within said slot.

7. A scale including, in combination, a main beam, means for rockingly mounting said beam, a poise beam in advance of said main beam, one of said beams being formed with longitudinally extending slots, projections extending substantially perpendicular to the face of the second of said beams and riding in sliding contact with the edges of said slots, and a poise weight mounted by said poise beam.

8. A scale including, in combination, a rockingly mounted main beam, a poise beam slidably coupled to said main beam, a rearwardly projecting extension forming a part of said poise beam and overlapping the end of said main beam, and an adjusting screw operatively coupled to said poise beam and having screw threaded engagement with said main beam for effecting relative movements of said beams.

HAROLD L. WALKER.